United States Patent
Liu et al.

(10) Patent No.: US 10,821,979 B2
(45) Date of Patent: Nov. 3, 2020

(54) METHOD AND DEVICE FOR AUTOMATICALLY REVERSING VEHICLE

(71) Applicants: Neusoft Corporation, Shenyang (CN); Neusoft Reach Automotive Technology (Shanghai) Co., Ltd., Shanghai (CN)

(72) Inventors: Wei Liu, Shenyang (CN); Wei Liu, Shenyang (CN)

(73) Assignee: NEUSOFT REACH AUTOMOTIVE TECHNOLOGY (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 16/112,662

(22) Filed: Aug. 25, 2018

(65) Prior Publication Data
US 2019/0270451 A1  Sep. 5, 2019

(30) Foreign Application Priority Data
Mar. 1, 2018 (CN) .......................... 2018 1 0172118

(51) Int. Cl.
*B60W 30/18* (2012.01)
*B62D 15/02* (2006.01)
(Continued)

(52) U.S. Cl.
CPC ... *B60W 30/18036* (2013.01); *B60R 16/0238* (2013.01); *B60W 30/06* (2013.01);
(Continued)

(58) Field of Classification Search
CPC ......... G05D 1/0221; G05D 2201/0213; G05D 1/0212; B60W 30/06; B60W 30/18036;
(Continued)

(56) References Cited

U.S. PATENT DOCUMENTS 5,375,059 A * 12/1994 Kyrtsos .............. B60K 31/0008
   342/357.24
5,781,870 A *  7/1998 Okawa ................. G05D 1/0891
   180/408

(Continued)

FOREIGN PATENT DOCUMENTS

CN   102358287 A   2/2012
CN   104843066 A   8/2015
(Continued)

OTHER PUBLICATIONS

EPO machine translation of JP 05-297943 (original JP application published Nov. 12, 1993) (Year: 1993).*
(Continued)

*Primary Examiner* — Faris S Almatrahi
*Assistant Examiner* — David A Testardi
(74) *Attorney, Agent, or Firm* — Kilpatrick Townsend & Stockton LLP

(57) ABSTRACT

A method and a device for automatically reversing a vehicle are provided. A forward track of a target vehicle is recorded in a forward process of the target vehicle. The target vehicle is controlled to be reversed from a current position and the target vehicle is controlled to be reversed along the forward track by adjusting a steering wheel angle of the target vehicle at each reversing moment, when an automatic reversing instruction for the target vehicle is detected after the target vehicle stops moving forward. The target vehicle is controlled to stop being reversed when a reversing stop instruction for the target vehicle is detected in a reversing process.

5 Claims, 8 Drawing Sheets

(51) Int. Cl.
  *B60R 16/023* (2006.01)
  *G05D 1/02* (2020.01)
  *B60W 30/06* (2006.01)
  *B62D 1/28* (2006.01)

(52) U.S. Cl.
  CPC ............ *B62D 1/28* (2013.01); *B62D 15/025* (2013.01); *G05D 1/0212* (2013.01); *G05D 1/0221* (2013.01); *B60W 2520/06* (2013.01); *B60W 2540/18* (2013.01); *B60W 2710/207* (2013.01); *G05D 2201/0213* (2013.01)

(58) Field of Classification Search
  CPC ........ B60W 50/082; B60W 2050/0089; B62D 15/0285; B62D 1/28
  See application file for complete search history.

(56) References Cited

U.S. PATENT DOCUMENTS

| | | | |
|---|---|---|---|
| 2004/0148100 A1* | 7/2004 | Kang | B62D 1/28 701/414 |
| 2013/0032421 A1* | 2/2013 | Bonne | B62D 15/0285 180/204 |
| 2013/0035821 A1* | 2/2013 | Bonne | B62D 15/0285 701/25 |
| 2015/0094945 A1* | 4/2015 | Cheng | G01C 21/34 701/408 |
| 2017/0158236 A1* | 6/2017 | Kim | B60R 1/00 |
| 2017/0269600 A1* | 9/2017 | Pink | G05D 1/0221 |
| 2019/0031194 A1* | 1/2019 | Kim | B60W 30/18036 |
| 2019/0256141 A1* | 8/2019 | Stroebel | B62D 15/028 |

FOREIGN PATENT DOCUMENTS

| | | | | |
|---|---|---|---|---|
| CN | 104950890 A | | 9/2015 | |
| CN | 107031357 A | | 8/2017 | |
| DE | 102013009218 A1 | * | 12/2014 | |
| DE | 102014213074 A1 | * | 1/2016 | |
| JP | 61067112 A | * | 4/1986 | ........... G05D 1/0221 |
| JP | 61067113 A | * | 4/1986 | ........... G05D 1/0221 |
| JP | 03189805 A | * | 8/1991 | |
| JP | 03230203 A | * | 10/1991 | |
| JP | 05297943 A | * | 11/1993 | |
| JP | H1078823 A | | 3/1998 | |
| JP | 2000298518 A | | 10/2000 | |
| JP | 2000298518 A | * | 10/2000 | |
| JP | 2001043498 A | * | 2/2001 | ........... G05D 1/0221 |
| JP | 2007237930 A | * | 9/2007 | |
| JP | 2007237930 A | | 9/2007 | |
| JP | 2008056173 A | * | 3/2008 | |
| JP | 2017524587 A | | 8/2017 | |
| KR | 1020150077823 A | * | 7/2015 | |
| KR | 1020190011852 A | * | 2/2019 | |
| KR | 1020190012608 A | * | 2/2019 | |
| WO | WO-2006092370 A1 | * | 9/2006 | ............... B62D 1/00 |
| WO | WO-2009147420 A1 | * | 12/2009 | ........... G05D 1/0221 |

OTHER PUBLICATIONS

JPO machine translation of JP 05-297943 (original JP document published Nov. 12, 1993) (Year: 1993).*
EPO machine translation of JP 2008-056173 (original JP document published Mar. 13, 2008) (Year: 2008).*
KIPO translation of KR 10-2015-0077823 (original KR document published Jul. 8, 2015) (Year: 2015).*
Certified copies of Korean priority applications from U.S. Appl. No. 16/044,508, filed Jul. 25, 2018 (Year: 2018).*
KIPO translation of KR 10-2019-0011852 (corresponding to application 10-2017-0093931, original KR document published Feb. 8, 2019) (Year: 2019).*
KIPO translation of KR 10-2019-0012608 (corresponding to application 10-2017-0095858, original KR document published Feb. 11, 2019) (Year: 2019).*
EPO machine translation of JP 2000-298518 (original JP document published Oct. 24, 2000) (Year: 2000).*
EPO machine translation of JP 2007-237930 (original JP document published Sep. 20, 2007) (Year: 2007).*
JP Second Office Action dated Feb. 25, 2020 in the corresponding JP application(application No. 2018-172218).
JP First Office Action dated Nov. 12, 2019 in the corresponding JP application(application No. 2018-172218).

* cited by examiner

METHOD AND DEVICE FOR AUTOMATICALLY REVERSING VEHICLE

The present application claims priority to Chinese Patent Application No. 201810172118.0, titled "METHOD AND DEVICE FOR AUTOMATICALLY REVERSING VEHICLE", filed on Mar. 1, 2018 with the State Intellectual Property Office of People's Republic of China, which is incorporated herein by reference in its entirety.

FIELD

The present disclosure relates to the technical field of automatic control, and particularly to a method for automatically reversing a vehicle and a device thereof.

BACKGROUND

In an actual driving process, a driver can usually drive the vehicle on the road ahead skillfully. Reversing is also a common operation in driving. A steering principle of front wheel drive is widely used in vehicles, such that the driver can control a reversing trace flexibly. Reversing usually occurs in scenarios such as low speed and high maneuverability requirements, such as parking and passages of narrow road.

It is difficult for the driver to cope with slightly complex reversing scenarios. This is because the driving seat faces the forward direction, which results in a small field of view in a reversing process, and thus causes lots of misjudgments. For example, the driver drives on a big-imperfection road, especially swerving and bumps in the road, and then will have to make a U-turn for some reasons, which is time consuming, and reduces the driving efficiency and causes a higher fuel combustion. This is a bad driving experience for the driver.

SUMMARY

In view of this, a method and a device for automatically reversing a vehicle are provided according to the embodiments of the disclosure, to improve a driving efficiency of the vehicle in a returning process and improve a driving experience of a driver.

A method for automatically reversing a vehicle is provided according to an embodiment of the disclosure. The method includes: recording a forward track of a target vehicle in a forward process of the target vehicle; controlling the target vehicle to be reversed from a current position and controlling the target vehicle to be reversed along the forward track by adjusting a steering wheel angle of the target vehicle at each reversing moment, when an automatic reversing instruction for the target vehicle is detected after the target vehicle stops moving forward; and controlling the target vehicle to stop being reversed when a reversing stop instruction for the target vehicle is detected in a reversing process.

In an embodiment, the controlling the target vehicle to be reversed along the forward track by adjusting a steering wheel angle of the target vehicle includes: determining a position deviation between a first actual position and a first ideal position, where the first actual position is a position of the target vehicle at a current reversing moment, and the first ideal position is a position in the forward track with a shortest distance from the first actual position; adjusting the steering wheel angle at the current reversing moment based on the position deviation; and controlling the target vehicle to be reversed based on the adjusted steering wheel angle, to decrease a position deviation between a second actual position and a second ideal position, where the second actual position is a position of the target vehicle at a next reversing moment, and the second ideal position is a position in the forward track with a shortest distance from the second actual position.

In an embodiment, the adjusting the steering wheel angle at the current reversing moment based on the position deviation includes: adjusting the steering wheel angle at the current reversing moment based on the position deviation and at least one of a course deviation and a curvature deviation. The course deviation is a deviation between an actual course and an ideal course, the actual course is a course of the target vehicle at the current reversing moment, and the ideal course is a course obtained by rotating a forward course of the target vehicle at the first ideal position by 180 degrees. The curvature deviation is a deviation between an actual curvature and an ideal curvature, the actual curvature is a curvature of the first actual position in a reversing track, and the ideal curvature is a curvature of the first ideal position in the forward track.

In an embodiment, the recording a forward track of a target vehicle includes: recording a vehicle position of the target vehicle at each recording moment; and forming the forward track of the target vehicle based on the recorded vehicle position at each recording moment.

In an embodiment, the recording a vehicle position of the target vehicle includes: recording a geodetic coordinate of the target vehicle; or recording a coordinate of the target vehicle in a local environment.

A device for automatically reversing a vehicle is provided according to an embodiment of the disclosure. The device includes a forward track recording unit, a reversing track controlling unit and a reversing stop controlling unit. The forward track recording unit is configured to record a forward track of a target vehicle in a forward process of the target vehicle. The reversing track controlling unit is configured to control the target vehicle to be reversed from a current position and control the target vehicle to be reversed along the forward track by adjusting a steering wheel angle of the target vehicle at each reversing moment, when an automatic reversing instruction for the target vehicle is detected after the target vehicle stops moving forward. The reversing stop controlling unit is configured to control the target vehicle to stop being reversed when a reversing stop instruction for the target vehicle is detected in a reversing process.

In an embodiment, the reversing track controlling unit includes a position deviation determining subunit, a steering wheel angle adjusting subunit and a reversing direction controlling subunit. The position deviation determining subunit is configured to determine a position deviation between a first actual position and a first ideal position. The first actual position is a position of the target vehicle at a current reversing moment, and the first ideal position is a position in the forward track with a shortest distance from the first actual position. The steering wheel angle adjusting subunit is configured to adjust the steering wheel angle at the current reversing moment based on the position deviation. The reversing direction controlling subunit is configured to control the target vehicle to be reversed based on the adjusted steering wheel angle, to decrease a position deviation between a second actual position and a second ideal position. The second actual position is a position of the target vehicle at a next reversing moment, and the second ideal position is a position in the forward track with a shortest distance from the second actual position.

In an embodiment, the steering wheel angle adjusting subunit is configured to adjust the steering wheel angle at the current reversing moment based on the position deviation and at least one of a course deviation and a curvature deviation. The course deviation is a deviation between an actual course and an ideal course, where the actual course is a course of the target vehicle at the current reversing moment, and the ideal course is a course obtained by rotating a forward course of the target vehicle at the first ideal position by 180 degrees. The curvature deviation is a deviation between an actual curvature and an ideal curvature, where the actual curvature is a curvature of the first actual position in a reversing track, and the ideal curvature is a curvature of the first ideal position in the forward track.

In an embodiment, the forward track recording unit includes a vehicle position recording subunit and a forward track forming subunit. The vehicle position recording subunit is configured to record a vehicle position of the target vehicle at each recording moment. The forward track forming subunit is configured to form the forward track of the target vehicle based on the recorded vehicle position at each recording moment.

In an embodiment, the vehicle position recording subunit is configured to: record a geodetic coordinate of the target vehicle; or record a coordinate of the target vehicle in a local environment.

A device for automatically reversing a vehicle is provided according to an embodiment of the disclosure. The device includes a processor, a memory and a system bus. The processor and the memory are connected by the system bus. The memory is configured to store one or more programs, the one or more programs include instructions, when executed by the processor, causing the processor to perform any one of the above methods.

A computer readable storage medium is provided according to an embodiment of the disclosure. The computer readable storage medium stores instructions, when executed on a terminal device, causing the terminal device to perform any one of the above methods.

A computer program product is provided according to an embodiment of the disclosure. The computer program product, when run on a terminal device, causes the terminal device to perform any one of the above methods.

A method and a device for automatically reversing a vehicle are provided according to embodiments of the disclosure. A forward track of a target vehicle is recorded in a forward process of the target vehicle. The target vehicle is controlled to be reversed from a current position and the target vehicle is controlled to be reversed along the forward track by adjusting a steering wheel angle of the target vehicle at each reversing moment, when an automatic reversing instruction for the target vehicle is detected after the target vehicle stops moving forward. The target vehicle is controlled to stop being reversed when a reversing stop instruction for the target vehicle is detected in a reversing process. It can be seen that, according to the embodiments of the present disclosure, the target vehicle is controlled to be reversed along the recorded forward track, the drive can return without making a U-turn, thereby improving a driving efficiency of the vehicle in a returning process and improving a driving experience of the driver.

BRIEF DESCRIPTION OF THE DRAWINGS

For explaining technical solutions according to embodiments of the disclosure more clearly, drawings used in the illustration of the embodiments of the disclosure are described briefly.

DETAILED DESCRIPTION OF THE EMBODIMENTS

The embodiments of the disclosure are clearly and completely described in conjunction with drawings. Apparently, the embodiments in the following description are merely some of the embodiments of the disclosure, and other embodiments which may be obtained based on the embodiments by those skilled in the art without inventive efforts fall within the scope of protection of the present disclosure.

A First Embodiment

Figure 1:
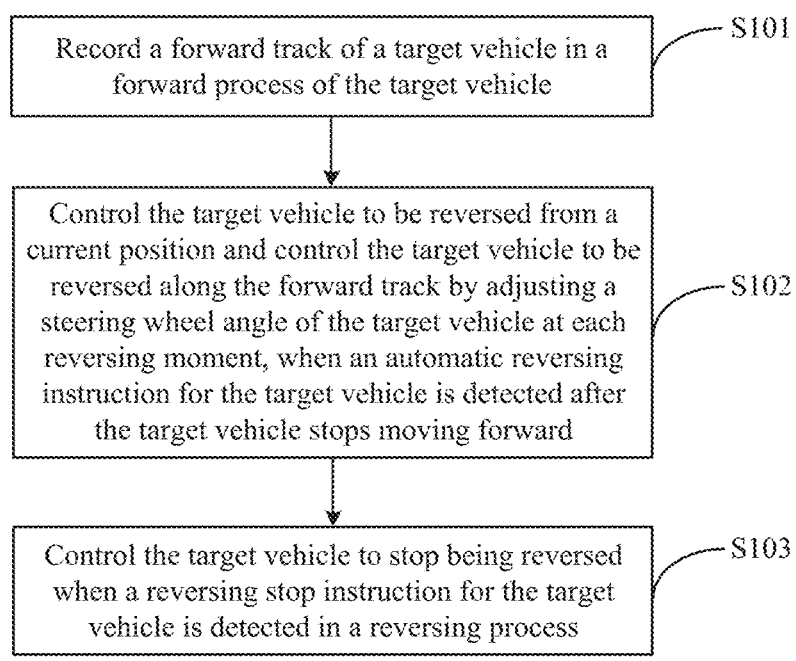
FIG. 1 is a schematic flowchart of a method for automatically reversing a vehicle according to an embodiment of the present disclosure.

FIG. 1 is a schematic flowchart of a method for automatically reversing a vehicle according to the embodiment of the present disclosure. The method includes steps S101 to S103.

In step S101, a forward track of a target vehicle is recorded in a forward process of the target vehicle.

In the embodiment of the present disclosure, any vehicle that adopts the method according to the embodiment to operate automatic reversing may be defined as the target vehicle. A position of the target vehicle may be detected in a real time manner in the forward process and stored in a local database of the target vehicle, to record the forward track of the target vehicle.

It can be understood that if the position of the vehicle was recorded indefinitely, the storage space of the local database will be fully occupied. Therefore, in order to save the storage space of the local database, and taking into account that a driver usually reverses in vicinity of the target vehicle, only positions of the target vehicle detected in the forward direction in recent time, e.g., in the last hour, are stored in the local database, or only positions of the target vehicle detected in recent forward distance, e.g., in the last 50 meters forward distance, are stored in the local database.

In step S102, the target vehicle is controlled to be reversed from a current position and the target vehicle is controlled to be reversed along the forward track by adjusting a steering wheel angle of the target vehicle at each reversing moment, when an automatic reversing instruction for the target vehicle is detected after the target vehicle stops moving forward.

A trigger mode of the automatic reversing instruction is not limited in the embodiment. For example, an automatic reversing button may be arranged on a control panel of the target vehicle. When the vehicle is in a stopped state, if the driver presses the automatic reversing button, or if the driver hangs a reverse gear and presses the automatic reversing button, the automatic reversing instruction for the target vehicle is triggered.

Figure 2:
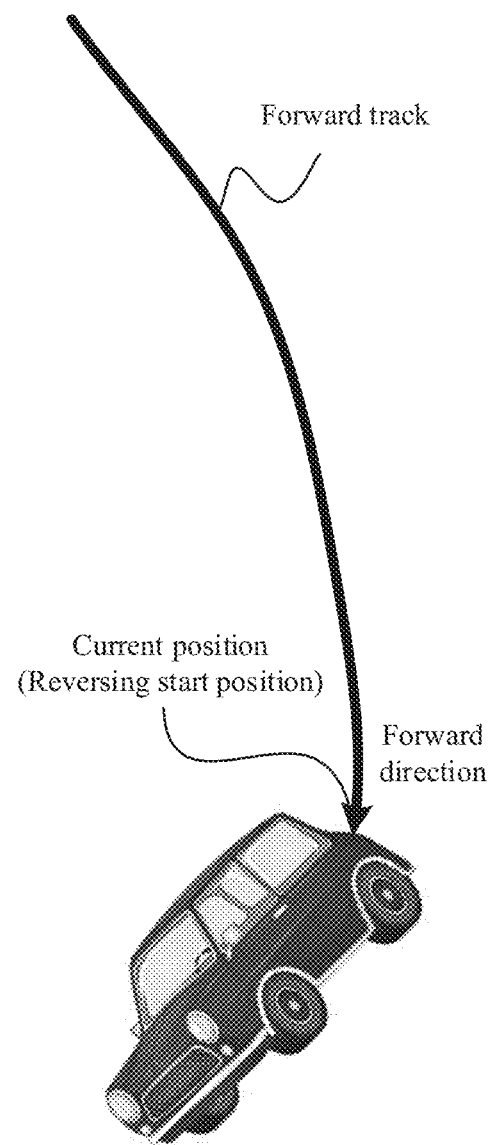
FIG. 2 is a schematic view of a forward track according to an embodiment of the present disclosure.
Figure 3:
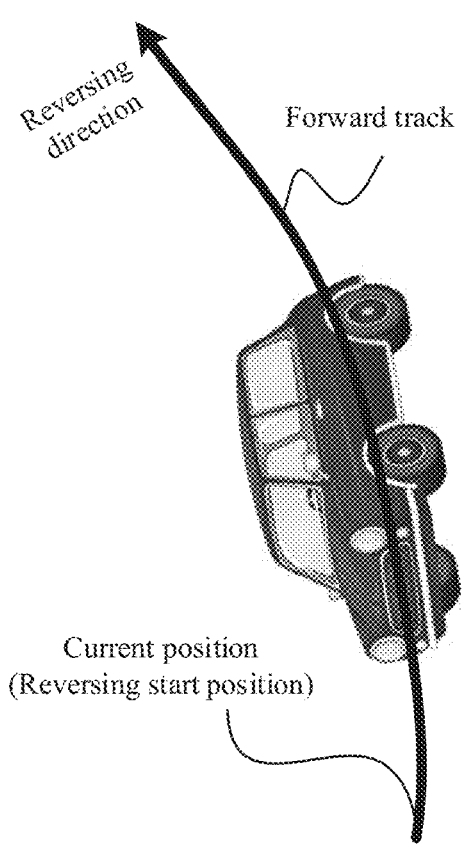
FIG. 3 is a schematic view of a reversing track according to an embodiment of the present disclosure.

FIG. 2 illustrates a forward track. In general, when the automatic reversing instruction is triggered, the current position of the target vehicle, i.e., a reversing start position, is an end position of the forward track. FIG. 3 illustrates a reversing track. When the automatic reversing instruction is detected by an automatic reversing system of the target vehicle, the automatic reversing system may rotate a forward course at each position point in the forward track by 180 degrees, and control the target vehicle to be reversed from the current position along the forward track in the rotated courses.

In the embodiment, a vehicle dynamic model may be created in the automatic reversing system of the target vehicle. The vehicle dynamic model may be used to determine the steering wheel angle and a reversing speed of the target vehicle in automatic reversing, to control the target vehicle to be reversed along the forward track automatically.

The steering wheel angle at each reversing position point may be determined by the rotated course. It can be understood that the reversing track may be deviated from the forward track in the reversing process. Therefore, the steering wheel angle of the target vehicle may be detected in a preset time interval (for example, 0.5 seconds). At each detecting moment (i.e. current reversing moment), if the target vehicle detects that it has been or is to deviate from the forward track, the target vehicle adjusts the current steering wheel angle, to control the target vehicle back to the forward track during a process that the target vehicle is reversed based on the adjusted steering wheel angle. In the reversing process, the reversing speed may be a fixed reversing speed, such as a default speed, or a lowest speed (except 0) in the forward process. In an embodiment, if the driver manually controls the reversing speed by e.g., throttle, the fixed reversing speed is switched to manual control speed.

It can be understood that there are a variety of reasons for reversing along the forward track, for example, there is no enough space to make a U-turn, or it is difficult for the driver to back up the vehicle along the complex path. Whether there is a need to reverse along the forward track may be determined by experiences of the driver. Or, a reversing detection instruction is triggered by the driver before triggering the automatic reversing instruction, such that the automatic reversing system can determine whether the reversing along the forward track is needed by detecting surrounding environment of the forward track on detecting the reversing detection instruction, and prompt a determining result.

In step S103, the target vehicle is controlled to stop being reversed when a reversing stop instruction for the target vehicle is detected in a reversing process.

A trigger mode of the reversing stop instruction is not limited in the embodiment. For example, a reversing stop button may be arranged on the control panel of the target vehicle. In the reversing process, the reversing stop instruction for the target vehicle is triggered when the driver presses the reversing stop button. For another example, before triggering the reversing stop instruction, a preset reversing length (such as 20 meters) may be set by the driver or the automatic reversing system. In the reversing process, an actual reversing distance may be accumulated in a real time manner. When the accumulated actual reversing distance reaches the preset reversing length, the reversing stop instruction is triggered by the automatic reversing system automatically. In one embodiment, in a case that the above fixed reversing speed is used to reverse, a preset reversing time may be set based on the fixed reversing speed by the driver or the automatic reversing system (for example, a higher fixed reversing speed leads to a shorter preset reversing time). In the reversing process, an actual reversing time is accumulated in a real time manner. When the accumulated actual reversing time reaches the preset reversing time, the reversing stop instruction is triggered by the automatic reversing system automatically.

In summary, a method for automatically reversing a vehicle is provided according to the embodiment of the disclosure. A forward track of a target vehicle is recorded in a forward process of the target vehicle. The target vehicle is controlled to be reversed from a current position and the target vehicle is controlled to be reversed along the forward track by adjusting a steering wheel angle of the target vehicle at each reversing moment, when an automatic reversing instruction for the target vehicle is detected after the target vehicle stops moving forward. The target vehicle is controlled to stop being reversed when a reversing stop instruction for the target vehicle is detected in a reversing process. It can be seen that, according to the embodiment of the present disclosure, the target vehicle is controlled to be reversed along the recorded forward track, the drive can return without making a U-turn, thereby improving a driving efficiency of the vehicle in a returning process and improving a driving experience of the driver.

A Second Embodiment

It should be noted that an implementation of the step S101 in the first embodiment is introduced via a following step S401 in the second embodiment.

Figure 4:
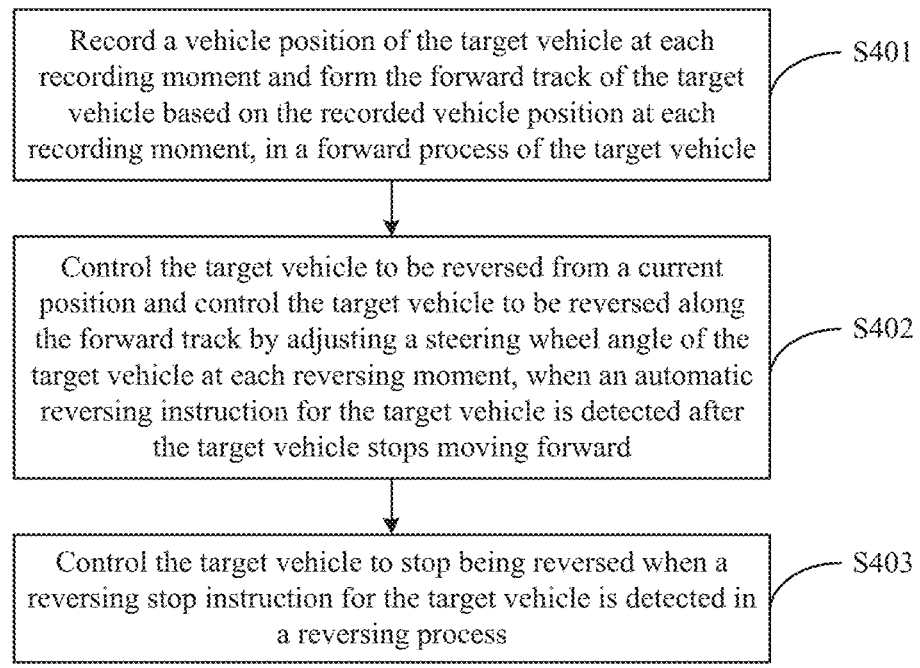
FIG. 4 is a schematic flowchart of a method for automatically reversing a vehicle according to another embodiment of the present disclosure.

FIG. 4 is a schematic flowchart of a method for automatically reversing a vehicle according to another embodiment of the present disclosure. The method includes steps S401 to S403.

In step S401, in a forward process of the target vehicle, a vehicle position of the target vehicle is recorded at each recording moment, the forward track of the target vehicle is formed based on the recorded vehicle position at each recording moment.

Figure 5:
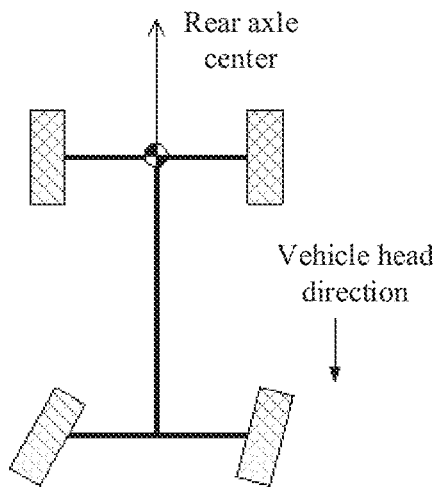
FIG. 5 is a schematic view of a rear axle center of a vehicle according to an embodiment of the present disclosure.

In the forward process, the vehicle position of the target vehicle may be obtained constantly by a positioning system in a preset time interval (such as, every 0.5 seconds). In one embodiment, a position change coordinate of a rear axle center (as illustrated in FIG. 5) or other part of the target vehicle may be obtained.

In one implementation of the embodiment, the vehicle position of the target vehicle may be recorded by recording a geodetic coordinate of the target vehicle. In this implementation, a satellite positioning system may be installed on a part A of the target vehicle, latitude and longitude coordinates of the part A are obtained by the satellite positioning system. Then, latitude and longitude coordinates (i.e. the geodetic coordinate) of the rear axle center of the target vehicle are calculated based on a relative position relationship between the part A and the rear axle center. The calculated latitude and longitude coordinates are taken as the vehicle position of the target vehicle.

In another implementation of the embodiment, the vehicle position of the target vehicle may be recorded by recording a coordinate of the target vehicle in a local environment. In this implementation, a laser radar or a camera may be installed on a part B of the target vehicle, a position coordinate of the part B in a local environment is obtained by a local positioning system based on the laser radar or the camera. Then, a local coordinate of the rear axle center of the target vehicle is calculated based on a relative position relationship between the part B and the rear axle center. The calculated local coordinate is taken as the vehicle position of the target vehicle.

It can be seen that, in the forward process, the vehicle position of the target vehicle, i.e. a position coordinate of the target vehicle at a certain moment, is obtained by the positioning systems. In this way, with movement of the target vehicle, a series of coordinate points are recorded. The coordinate points recorded in each time period may be smoothed, to form a moving track of the target vehicle. The moving track is the forward track of the target vehicle.

In step S402, the target vehicle is controlled to be reversed from a current position and the target vehicle is controlled to be reversed along the forward track by adjusting a steering wheel angle of the target vehicle at each reversing moment, when an automatic reversing instruction for the target vehicle is detected after the target vehicle stops moving forward.

In step S403, the target vehicle is controlled to stop being reversed when a reversing stop instruction for the target vehicle is detected in a reversing process.

It should be noted that the steps S402 to S403 are the same as steps S102 to S103 in the first embodiment respectively, one may refer to the descriptions of the first embodiment for a related part, which are not repeated herein.

In summary, a method for automatically reversing a vehicle is provided according to the embodiment of the disclosure. In a forward process of the target vehicle, a vehicle position of the target vehicle is recorded at each recording moment, the forward track of the target vehicle is formed based on the recorded vehicle position at each recording moment. The target vehicle is controlled to be reversed from a current position and the target vehicle is controlled to be reversed along the forward track by adjusting a steering wheel angle of the target vehicle at each reversing moment, when an automatic reversing instruction for the target vehicle is detected after the target vehicle stops moving forward. The target vehicle is controlled to stop being reversed when a reversing stop instruction for the target vehicle is detected in a reversing process. It can be seen that, according to the embodiment of the present disclosure, the forward track of the target vehicle is formed based on the recorded vehicle positions, the target vehicle is controlled to be reversed along the recorded forward track, the drive can return without making a U-turn, thereby improving a driving efficiency of the vehicle in a returning process and improving a driving experience of the driver.

A Third Embodiment

It should be noted that a implementation of the step S102 in the first embodiment is introduced via following steps S602 to S604 in the third embodiment.

Figure 6:
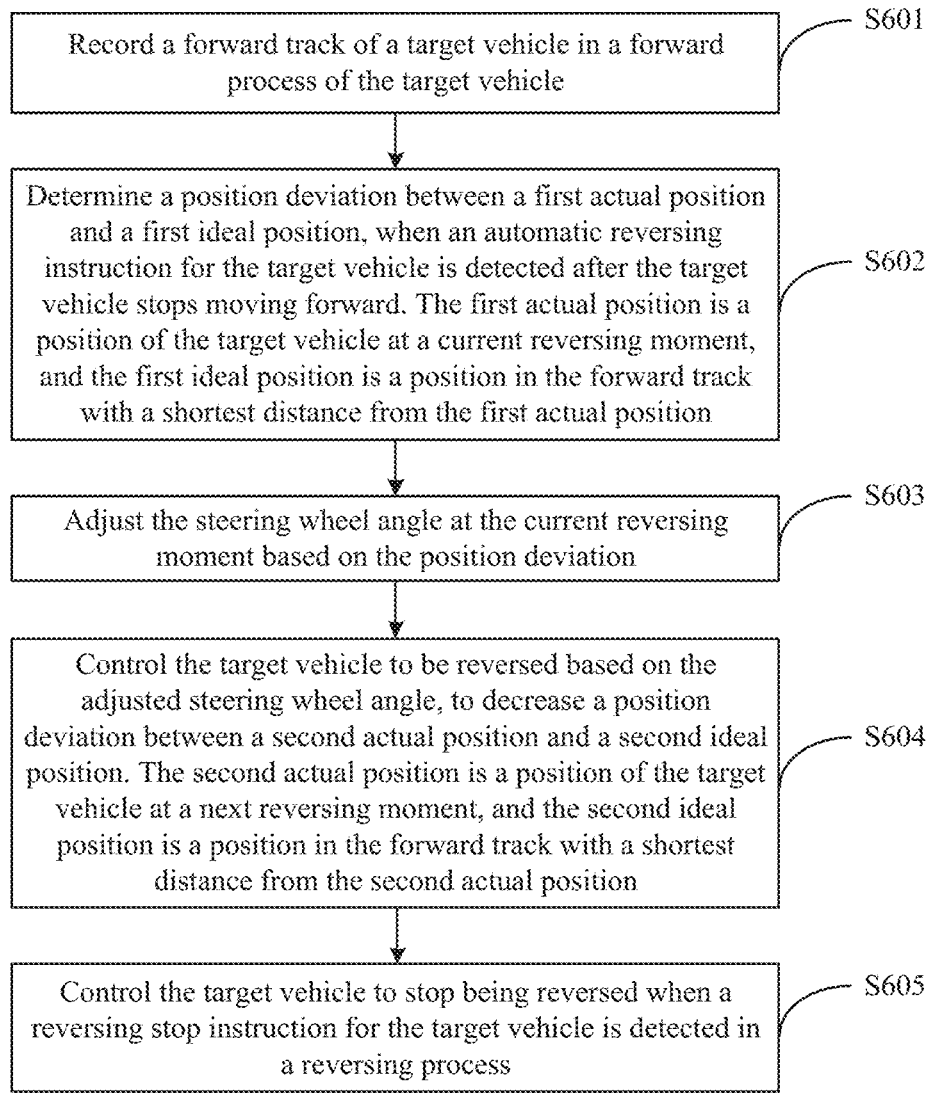
FIG. 6 is a schematic flowchart of a method for automatically reversing a vehicle according to another embodiment of the present disclosure.

FIG. 6 is a schematic flowchart of a method for automatically reversing a vehicle according to the embodiment. The method includes steps S601 to S605.

In step S601, a forward track of a target vehicle is recorded in a forward process of the target vehicle.

It should be noted that the step S601 is the same as the step S101 in the first embodiment above, one may refer to the description of the first embodiment for a related part, which is not repeated herein. Of course, the step S601 may also be replaced by the step S401 in the second embodiment, one may refer to the description of the second embodiment for a related part, which is not repeated herein.

In step S602, a position deviation between a first actual position and a first ideal position is determined when an automatic reversing instruction for the target vehicle is detected after the target vehicle stops moving forward. The first actual position is a position of the target vehicle at a current reversing moment, and the first ideal position is a position in the forward track with a shortest distance from the first actual position.

In the embodiment, one may refer to the first embodiment the description of the automatic reversing instruction, which is not repeated herein.

When the automatic reversing instruction is detected, the target vehicle is controlled to be reversed along the forward track. As an example, a reversing position of the target vehicle may be detected in a preset time interval (such as, every 0.5 seconds) in a reversing process. Current detection moment is defined as a current reversing moment herein. It should be noted that, at the current reversing moment, if a vehicle position of the target vehicle is obtained by a way of obtaining the geodetic coordinate in a forward process in the second embodiment, the vehicle position is obtained in the same way of obtaining the geodetic coordinate in the reversing process. If a vehicle position of the target vehicle is obtained by a way of obtaining the local coordinate in a forward process in the second embodiment, the vehicle position is obtained in the same way of obtaining the local coordinate in the reversing process, such that the position deviation may be determined in a same coordinate calibration mode.

For the ease of distinguishing, the vehicle position (x_v, y_v) obtained at the current reversing moment is defined as the first actual position in the embodiment.

Figure 7:
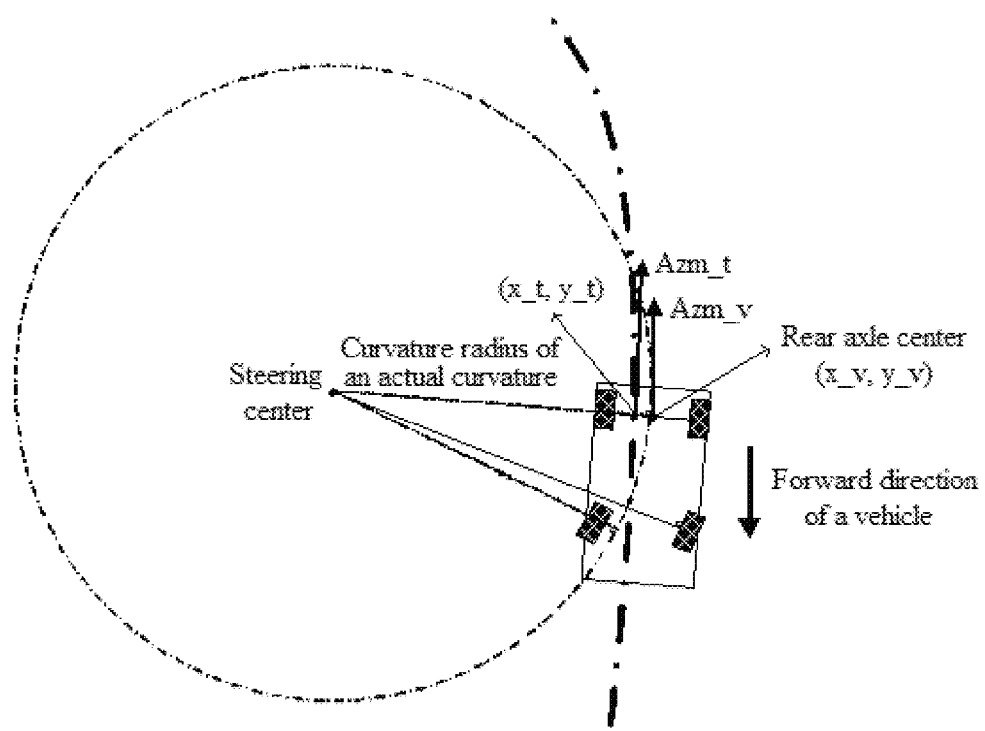
FIG. 7 is a schematic view of a driving track and reversing control parameters according to an embodiment of the present disclosure.

The target vehicle is controlled to be reversed along the forward track recorded in step S601 in the embodiment. However, the first actual position (which may specifically be a position of a rear axle center) may be not located on the forward track. Therefore, as illustrated in FIG. 7, in order to adjust a reversing route, a position point (x_t, y_t) may be selected on the forward track, the position point (x_t, y_t) is a position point in the forward track with a shortest distance from the first actual position. The position point (x_t, y_t) is defined as the first ideal position in the embodiment.

Then, a position deviation $\Delta P_r P_v$ between the first actual position (x_v, y_v) and the first ideal position (x_t, y_t) is calculated. It can be known that how far the target vehicle deviates from the forward track based on the position deviation $\Delta P_r P_v$.

In step S603, the steering wheel angle at the current reversing moment is adjusted based on the position deviation.

In the embodiment, the steering wheel angle at the current reversing moment may be adjusted based on the position deviation $\Delta P_r P_v$, to make the reversing route of the target vehicle close to the forward track as far as possible by adjusting the current steering wheel angle.

In one implementation of the embodiment, step S603 may include adjusting the steering wheel angle at the current reversing moment based on the position deviation and at least one of a course deviation and a curvature deviation. In this implementation, in order to ensure the adjusting result of the steering wheel angle more accurately, the steering wheel angle at the current reversing moment may be adjusted based on the position deviation and at least one of the course deviation and the curvature deviation.

The course deviation is a deviation between an actual course and an ideal course, where the actual course is a course of the target vehicle at the current reversing moment, and the ideal course is a course obtained by rotating a forward course of the target vehicle at the first ideal position by 180 degrees.

As illustrated in FIG. 7, in this implementation, if there is a need to adjust the steering wheel angle by using the course deviation, a course (Azm_v) of the target vehicle at the current reversing moment is detected in the reversing process. The course (Azm_v) of the target vehicle at the current reversing moment is defined as the actual course in the embodiment. In addition, in the step S401 in the second embodiment, in addition to recording the vehicle position of the target vehicle, a forward course of the target vehicle at each recording moment is also recorded. The forward course at the first ideal position (x_t, y_t) may be obtained based on a correspondence between each vehicle position and each forward course. In the embodiment, a course (Azm_t) obtained by rotating the forward course of the target vehicle at the first ideal position (x_t, y_t) by 180 degrees is defined as the ideal course. Then, a course deviation $\Delta Azm_t Azm_v$ between the actual course (Azm_v) and the ideal course (Azm_t) is calculated.

The curvature deviation is a deviation between an actual curvature and an ideal curvature. The actual curvature is a curvature of the first actual position in a reversing track, and the ideal curvature is a curvature of the first ideal position in the forward track.

As illustrated in FIG. 7, in this implementation, if there is a need to adjust the steering wheel angle by using the curvature deviation, a curvature (R_v) of the first actual position in the reversing track is calculated. The curvature (R_v) corresponding to the current reversing moment is defined as the actual curvature. In addition, in the step S401 in the second embodiment, in addition to recording the vehicle position of the target vehicle, a curvature of each vehicle position in the forward track is also calculated. A curvature (R_t) of the first ideal position (x_t, y_t) in the forward track may be obtained based on a correspondence between each vehicle position and each curvature. In the embodiment, the curvature (R_t) is defined as the ideal curvature. Then, a curvature deviation $\Delta R_t R_v$ between the actual curvature (R_v) and the ideal curvature (R_t) is calculated.

In this way, the position deviation $\Delta P_t P_v$ and the course deviation $\Delta Azm_t Azm_v$ and/or the curvature deviation $\Delta R_t R_v$ may be weighted, to adjust the steering wheel angle at the current reversing moment.

In step S604, the target vehicle is controlled to be reversed based on the adjusted steering wheel angle, to decrease a position deviation between a second actual position and a second ideal position. The second actual position is a position of the target vehicle at a next reversing moment, and the second ideal position is a position in the forward track with a shortest distance from the second actual position.

The vehicle position of the target vehicle at the next reversing moment may be located on the forward track as far as possible by adjusting the steering wheel angle at the current reversing moment and controlling the target vehicle to be reversed based on the adjusted steering wheel angle.

On arriving at the next reversing moment, the next reversing moment is taken as the current reversing moment, and then the step S602 is performed to determine the position deviation until the reversing stop instruction is detected in the step S605.

In step S605, the target vehicle is controlled to stop being reversed when a reversing stop instruction for the target vehicle is detected in a reversing process.

It should be noted that step S605 is the same as the step S103 in the first embodiment, one may refer to the description of the first embodiment for a related part, which is not repeated herein.

In summary, a method for automatically reversing a vehicle is provided according to the embodiment. A forward track of a target vehicle is recorded in a forward process of the target vehicle. The target vehicle is controlled to be reversed when an automatic reversing instruction for the target vehicle is detected after the target vehicle stops moving forward. In a reversing process, the steering wheel angle at the current reversing moment is adjusted based on the position deviation and at least one of the course deviation and the curvature deviation. The target vehicle is controlled to stop being reversed when a reversing stop instruction for the target vehicle is detected. It can be seen that, according to the embodiment, the steering wheel angle may be adjusted in a real time manner, to ensure that the reversing path of the target vehicle is located on the forward track.

A Fourth Embodiment

Figure 8A:
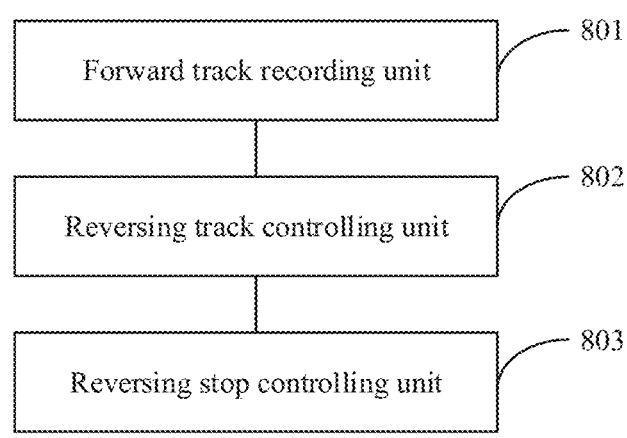
FIG. 8A is a schematic structural view of a device for automatically reversing a vehicle according to an embodiment of the present disclosure.

FIG. 8A is a schematic structural view of a device for automatically reversing a vehicle according to the embodiment. The device includes a forward track recording unit 801, a reversing track controlling unit 802 and a reversing stop controlling unit 803.

The forward track recording unit 801 is configured to record a forward track of a target vehicle in a forward process of the target vehicle.

The reversing track controlling unit 802 is configured to control the target vehicle to be reversed from a current position and control the target vehicle to be reversed along the forward track by adjusting a steering wheel angle of the target vehicle at each reversing moment, when an automatic reversing instruction for the target vehicle is detected after the target vehicle stops moving forward.

The reversing stop controlling unit 803 is configured to control the target vehicle to stop being reversed when a reversing stop instruction for the target vehicle is detected in a reversing process.

Figure 8B:
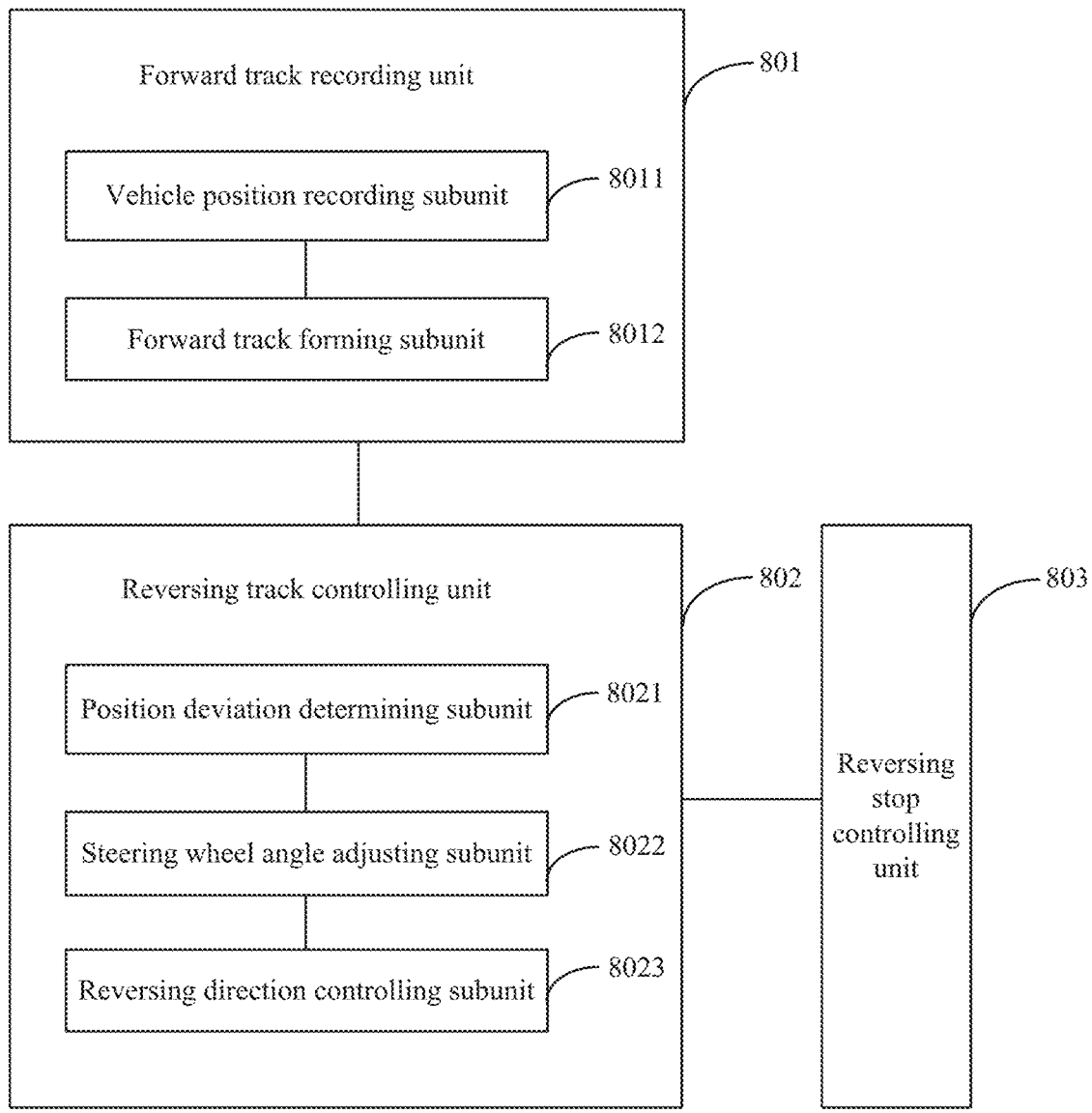
FIG. 8B is a schematic structural view of a device for automatically reversing a vehicle according to another embodiment of the present disclosure.

In an implementation of the embodiment, as illustrated in FIG. 8B, the reversing track controlling unit 802 may include a position deviation determining subunit 8021, a steering wheel angle adjusting subunit 8022 and a reversing direction controlling subunit 8023.

The position deviation determining subunit 8021 is configured to determine a position deviation between a first actual position and a first ideal position. The first actual position is a position of the target vehicle at a current reversing moment, and the first ideal position is a position in the forward track with a shortest distance from the first actual position.

The steering wheel angle adjusting subunit 8022 is configured to adjust the steering wheel angle at the current reversing moment based on the position deviation.

The reversing direction controlling subunit 8023 is configured to control the target vehicle to be reversed based on the adjusted steering wheel angle, to decrease a position deviation between a second actual position and a second ideal position. The second actual position is a position of the target vehicle at a next reversing moment, and the second ideal position is a position in the forward track with a shortest distance from the second actual position.

In an implementation of the embodiment, the steering wheel angle adjusting subunit 8022 may be configured to adjust the steering wheel angle at the current reversing moment based on the position deviation and at least one of a course deviation and a curvature deviation. The course deviation is a deviation between an actual course and an ideal course, the actual course is a course of the target vehicle at the current reversing moment, and the ideal course is a course obtained by rotating a forward course of the target vehicle at the first ideal position by 180 degrees. The curvature deviation is a deviation between an actual curvature and an ideal curvature, the actual curvature is a curvature of the first actual position in a reversing track, and the ideal curvature is a curvature of the first ideal position in the forward track.

In an implementation of the embodiment, as illustrated in FIG. 8B, the forward track recording unit 801 may include a vehicle position recording subunit 8011 and a forward track forming subunit 8012.

The vehicle position recording subunit 8011 is configured to record a vehicle position of the target vehicle at each recording moment.

The forward track forming subunit 8012 is configured to form the forward track of the target vehicle based on the recorded vehicle position at each recording moment.

In an implementation of the embodiment, the vehicle position recording subunit 8011 may be configured to: record a geodetic coordinate of the target vehicle; or record a coordinate of the target vehicle in a local environment.

Figure 9:
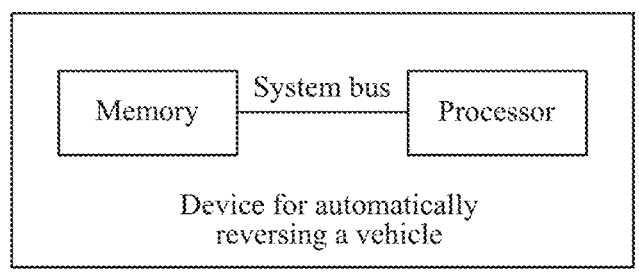
FIG. 9 is a schematic structural view of a device for automatically reversing a vehicle according to another embodiment of the present disclosure.

Furthermore, as shown in FIG. 9, a device for automatically reversing a vehicle is provided according to an embodiment of the disclosure. The device includes a processor, a memory and a system bus. The processor and the memory are connected by the system bus. The memory is configured to store one or more programs, the one or more programs include instructions, when executed by the processor, causing the processor to perform any one of the above methods.

Furthermore, a computer readable storage medium is provided according to an embodiment of the disclosure. The computer readable storage medium stores instructions, when executed on a terminal device, causing the terminal device to perform any one of the above methods.

Furthermore, a computer program product is provided according to an embodiment of the disclosure. The computer program product, when run on a terminal device, causes the terminal device to perform any one of the above methods.

The software product may be stored in a storage medium, such as a ROM/RAM, a magnetic disk, and an optic disk, and include multiple instructions so as to make a computer device (which may be a personal computer, a server, or a communication device such as a media gateway) perform the method described in each embodiment or some parts of the embodiments of the present disclosure.

It should be noted that the embodiments of the present disclosure are described in a progressive manner, and each embodiment places emphasis on the difference from other embodiments. Therefore, one embodiment can refer to other embodiments for the same or similar parts. Since the device disclosed in the embodiments corresponds to the method disclosed in the embodiments, the description of the device is simple, and reference may be made to the relevant part of the method.

The invention claimed is:

1. A method for automatically reversing a vehicle, the method comprising:
   recording a forward track of a target vehicle in a forward process of the target vehicle, wherein the recording of the forward track of the target vehicle comprises: recording a vehicle position of the target vehicle at each recording moment, recording a forward course of the target vehicle at every recording moment, and calculating an ideal curvature of the target vehicle at each vehicle position; and forming the forward track of the target vehicle based on the recorded vehicle position at each recording moment;
   controlling the target vehicle to be reversed from a current position and controlling the target vehicle to be reversed along the forward track by adjusting a steering wheel angle of the target vehicle at each reversing moment, when an automatic reversing instruction for the target vehicle is detected after the target vehicle stops moving forward; and
   controlling the target vehicle to stop being reversed when a reversing stop instruction for the target vehicle is detected in a reversing process,
   wherein the controlling of the target vehicle to be reversed along the forward track by adjusting the steering wheel angle of the target vehicle comprises:
   determining a position deviation between a first actual position and a first ideal position, wherein the first actual position is a position of the target vehicle at a current reversing moment, and the first ideal position is a position in the forward track with a shortest distance from the first actual position;
   adjusting the steering wheel angle at the current reversing moment based on the position deviation between the first actual position and the first ideal position; and
   controlling the target vehicle to be reversed based on the adjusted steering wheel angle, to decrease a position deviation between a second actual position and a second ideal position, wherein the second actual position is a position of the target vehicle at a next reversing moment, and the second ideal position is a position in the forward track with a shortest distance from the second actual position,
   wherein the adjusting of the steering wheel angle at the current reversing moment based on the position deviation between the first actual position and the first ideal position comprises:
   adjusting the steering wheel angle at the current reversing moment based on the position deviation between the first actual position and the first ideal position and at least one of a course deviation and a curvature deviation,
   wherein the course deviation is a deviation between an actual course and the ideal course, wherein the actual course is a course of the target vehicle at the current reversing moment, and the ideal course is a course obtained by rotating a forward course of the target vehicle at the first ideal position by 180 degrees; and
   wherein the curvature deviation is a deviation between an actual curvature and an ideal curvature, wherein the actual curvature is a curvature of the first actual position in a reversing track, and the ideal curvature is a curvature of the first ideal position in the forward track.

2. The method according to claim 1, wherein the recording a vehicle position of the target vehicle comprises:
  recording a geodetic coordinate of the target vehicle; or
  recording a coordinate of the target vehicle in a local environment.

3. A device for automatically reversing a vehicle, the device comprising:
  a processor, a memory for storing program instructions, and a system bus, wherein the processor and the memory are connected via the system bus, and the processor executes the program instructions to:
  record a forward track of a target vehicle in a forward process of the target vehicle, wherein the recording of the forward track of the target vehicle comprises: recording a vehicle position of the target vehicle at each recording moment, recording a forward course of the target vehicle at every recording moment, and calculating an ideal curvature of the target vehicle at each vehicle position; and forming the forward track of the target vehicle based on the recorded vehicle position at each recording moment;
  control the target vehicle to be reversed from a current position and control the target vehicle to be reversed along the forward track by adjusting a steering wheel angle of the target vehicle at each reversing moment, when an automatic reversing instruction for the target vehicle is detected after the target vehicle stops moving forward; and
  control the target vehicle to stop being reversed when a reversing stop instruction for the target vehicle is detected in a reversing process,
  wherein the processor executes the program instructions further to:
  determine a position deviation between a first actual position and a first ideal position, wherein the first actual position is a position of the target vehicle at a current reversing moment, and the first ideal position is a position in the forward track with a shortest distance from the first actual position;
  adjust the steering wheel angle at the current reversing moment based on the position deviation between the first actual position and the first ideal position; and
  control the target vehicle to be reversed based on the adjusted steering wheel angle, to decrease a position deviation between a second actual position and a second ideal position, wherein the second actual position is a position of the target vehicle at a next reversing moment, and the second ideal position is a position in the forward track with a shortest distance from the second actual position,
  wherein the processor executes the program instructions further to adjust the steering wheel angle at the current reversing moment based on the position deviation between the first actual position and the first ideal position and at least one of a course deviation and a curvature deviation;
  wherein the course deviation is a deviation between an actual course and an ideal course, wherein the actual course is a course of the target vehicle at the current reversing moment, and the ideal course is a course obtained by rotating a forward course of the target vehicle at the first ideal position by 180 degrees; and
  wherein the curvature deviation is a deviation between an actual curvature and the ideal curvature, wherein the actual curvature is a curvature of the first actual position in a reversing track, and the ideal curvature is a curvature of the first ideal position in the forward track.

4. The device according to claim 3, wherein the processor executes the program instructions further to:
  record a geodetic coordinate of the target vehicle; or
  record a coordinate of the target vehicle in a local environment.

5. A non-transitory computer readable storage medium storing instructions, when executed on a terminal device, causing the terminal device to:
  record a forward track of a target vehicle in a forward process of the target vehicle, wherein the recording of the forward track of the target vehicle comprises: recording a vehicle position of the target vehicle at each recording moment, recording a forward course of the target vehicle at every recording moment, and calculating an ideal curvature of the target vehicle at each vehicle position; and forming the forward track of the target vehicle based on the recorded vehicle position at each recording moment;
  control the target vehicle to be reversed from a current position and control the target vehicle to be reversed along the forward track by adjusting a steering wheel angle of the target vehicle at each reversing moment, when an automatic reversing instruction for the target vehicle is detected after the target vehicle stops moving forward; and
  control the target vehicle to stop being reversed when a reversing stop instruction for the target vehicle is detected in a reversing process,
  wherein the control of the target vehicle to be reversed along the forward track by adjusting a steering wheel angle of the target vehicle comprises:
  determining a position deviation between a first actual position and a first ideal position, wherein the first actual position is a position of the target vehicle at a current reversing moment, and the first ideal position is a position in the forward track with a shortest distance from the first actual position;
  adjusting the steering wheel angle at the current reversing moment based on the position deviation between the first actual position and the first ideal position; and
  controlling the target vehicle to be reversed based on the adjusted steering wheel angle, to decrease a position deviation between a second actual position and a second ideal position, wherein the second actual position is a position of the target vehicle at a next reversing moment, and the second ideal position is a position in the forward track with a shortest distance from the second actual position,
  wherein the adjusting of the steering wheel angle at the current reversing moment based on the position deviation between the first actual position and the first ideal position comprises:
  adjusting the steering wheel angle at the current reversing moment based on the position deviation between the first actual position and the first ideal position and at least one of a course deviation and a curvature deviation,
  wherein the course deviation is a deviation between an actual course and an ideal course, wherein the actual course is a course of the target vehicle at the current reversing moment, and the ideal course is a course obtained by rotating a forward course of the target vehicle at the first ideal position by 180 degrees; and
  wherein the curvature deviation is a deviation between an actual curvature and the ideal curvature, wherein the actual curvature is a curvature of the first actual position in a reversing track, and the ideal curvature is a curvature of the first ideal position in the forward track.

\* \* \* \* \*